United States Patent
Ryoo et al.

(10) Patent No.: US 11,460,089 B2
(45) Date of Patent: Oct. 4, 2022

(54) PENDULUM VIBRATION DAMPER AND MANUFACTURING METHOD THEREOF

(71) Applicant: Toyota Jidosha Kabushiki Kaisha, Toyota (JP)

(72) Inventors: Yongjoo Ryoo, Susono (JP); Masayuki Ishibashi, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/487,810

(22) Filed: Sep. 28, 2021

(65) Prior Publication Data

US 2022/0120331 A1   Apr. 21, 2022

(30) Foreign Application Priority Data

Oct. 21, 2020   (JP) .............................. JP2020-176662

(51) Int. Cl.
*F16F 15/14*    (2006.01)
*F16H 45/02*    (2006.01)

(52) U.S. Cl.
CPC ........... *F16F 15/145* (2013.01); *F16H 45/02* (2013.01); *F16H 2045/0263* (2013.01)

(58) Field of Classification Search
CPC .............................................. F16H 2045/0263
See application file for complete search history.

(56) References Cited

U.S. PATENT DOCUMENTS

| 10,508,708 | B1 * | 12/2019 | Tomiyama | ............. F16H 45/02 |
| 10,619,703 | B2 * | 4/2020 | Kawahara | ............. F16H 45/02 |
| 2017/0234401 | A1 | 8/2017 | Horita et al. | |
| 2019/0170212 | A1 * | 6/2019 | Ishibashi | ............. F16F 15/1457 |
| 2020/0088264 | A1 * | 3/2020 | Nakamura | ........... B62D 25/088 |

FOREIGN PATENT DOCUMENTS

JP   2017-145857 A   8/2017
WO   WO-2016047789 A1 *   3/2016   .......... F16F 15/1205

* cited by examiner

*Primary Examiner* — Vicky A Johnson
(74) *Attorney, Agent, or Firm* — Oblon, McClelland, Maier & Neustadt, L.L.P.

(57) ABSTRACT

A pendulum vibration damper in which raceway surfaces are processed accurately at desired positions to damp vibrations effectively by oscillating motions of rolling masses, and a manufacturing method thereof. The pendulum vibration damper comprises a first attachment and a second attachment formed symmetrically. A first raceway surface is formed on the first attachment, and a second raceway surface is formed on the second attachment. The first attachment and the second attachment are attached to each surface of the inertia body a while being positioned to align the first raceway surface and the second raceway surface with a predetermined common profile in the axial direction.

8 Claims, 9 Drawing Sheets

PENDULUM VIBRATION DAMPER AND MANUFACTURING METHOD THEREOF

CROSS REFERENCE TO RELATED APPLICATION

The present disclosure claims the benefit of Japanese Patent Application No. 2020-176662 filed on Oct. 21, 2020 with the Japanese Patent Office, the disclosure of which is incorporated herein by reference in its entirety.

BACKGROUND

Field of the Disclosure

Embodiments of the present disclosure relate to the art of a pendulum vibration damper for damping torsional vibrations resulting from pulsation of torque by an oscillating motion or a pendulum motion of an inertia mass.

Discussion of the Related Art

JP-A-2017-145857 describes one example of a torsional vibration damper of this kind. A torsional vibration reducing device taught by JP-A-2017-145857 includes: a rotating body rotated by torque; an inertial body connected to the rotating body while being allowed to rotate relatively to the rotating body; a rolling body serving as a coupling member to transmit torque to the rotating body and to the inertial body; and a coupling portion formed on an outer circumferential surface of the rotating body. The coupling portion engages with the coupling member such that the first portion restricts movement of the coupling member in a rotational direction of the rotating body and allows movement of the coupling member in a radial direction of the rotating body. According to the example shown in FIG. 15 of JP-A-2017-145857, a pair of inertial bodies is arranged on both sides of the rotating body in an axial direction, and a rolling surface against which the rolling body is pressed by a centrifugal force is formed on the inertial body. Specifically, the rolling surface is curved such that a radially outermost portion is situated at a circumferentially intermediate portion. A curvature radius of the rolling surface is shorter than a radius of the rotating body between a center of the rotating body to the rolling surface. The rolling body is a column-shaped member that is thicker than the rotating body in the axial direction. Therefore, when the rolling body is centrifugally displaced radially outwardly along the coupling portion, both axial ends of the rolling body are pushed onto the rolling surface.

The rolling body centrifugally pushed onto the rolling surface is positioned at the intermediate portion of the rolling surface as long as the torque rotating the rotating body is smooth, and oscillated by pulsation of the torque along the rolling surface. When the rolling body is situated at one of width ends of the rolling surface, the rotating body and the inertia body rotate relatively to each other, and the rolling body is pushed back radially inwardly by the rolling surface. In this situation, the inertia body is pushed back to an initial position relative to the rotating body by a damping torque generated at a contact point between the rolling surface and the rolling body. Consequently, the inertia body is oscillated by the damping torque in opposite phase to an oscillation of the rotating body thereby damping torsional vibrations derived from the pulsation of the torque.

As described, according to the example shown in FIG. 15 of JP-A-2017-145857, the inertial bodies are arranged on both sides of the rotating body in an axial direction. In this case, therefore, the inertial bodies are processed separately to form the rolling surface thereon. Consequently, positions of the rolling surfaces would be displaced from a predetermined reference position. That is, profiles of the rolling surfaces would be displaced from each other. As a result, a rotational center axis of the rolling body would be tilted with respect to the rotational center axis when the rolling body is centrifugally pushed onto the rolling surface. That is, the rolling body would not be allowed to roll smoothly on the rolling surface, and the torsional vibrations would not be damped effectively by the oscillating motion of the rolling body.

SUMMARY

The present disclosure has been conceived noting the above-described technical problems, and it is therefore an object of the present disclosure to provide a pendulum vibration damper in which raceway surfaces are processed accurately at desired positions to damp vibrations effectively by oscillating motions of rolling masses, and a manufacturing method thereof.

According to one aspect of the present disclosure, there is provided a pendulum vibration damper, comprising: a rotary member that is rotated around a predetermined rotational center axis by a torque applied thereto; an inertia body that is arranged coaxially with the rotary member while being allowed to rotate relatively to the rotary member; a raceway surface that is arranged on a radially outer side of the rotational center axis of the inertia body; and a rolling mass that is held by the rotary member to revolve around the rotational center axis with a rotation of the rotary member while being allowed to move in a radial direction. In the pendulum vibration damper, the rolling mass is brought into contact to the raceway surface by a centrifugal force derived from the rotation of the rotary member, and oscillated on the raceway surface by a pulsation of the torque applied to the rotary member. The rolling mass comprises: a first mass having a circular shape; a second mass having a circular shape being opposed to the first mass in an axial direction; and a groove created between the first mass and the second mass. The raceway surface includes a first raceway surface to which the first mass is contacted by the centrifugal force, and a second raceway surface to which the second mass is contacted by the centrifugal force. The first raceway surface and the second raceway surface are arcuate surfaces that are depressed radially outwardly. A curvature radius of the first raceway surface is shorter than a radial distance between the first raceway surface and the rotational center axis, and a curvature radius of the second raceway surface is shorter than a radial distance between the second raceway surface and the rotational center axis. The inertia body is situated between the first raceway surface and the second raceway surface in the axial direction, and the inertia body comprises a rib that protrudes radially inwardly from the first raceway surface and the second raceway surface to be situated within the grove of the rolling mass at least partially so as to restrict an axial movement of the rolling mass. The rolling mass oscillated toward one end of the raceway surface by the pulsation of the torque applied to the rotary member is returned to a radially outermost portion of the raceway surface by a torque established by a displacement of the rolling mass from the radially outermost portion to said one end of the raceway surface. The torque thus established by the displacement of the rolling mass from the radially outermost portion to said one end of the raceway surface acts as a vibration damping torque to damp vibrations derived from the pulsation of the torque applied to the rotary member. In order to achieve the above-explained objectives, according to one aspect of the present disclosure, the pendulum vibration damper is provided with a first attachment on which the first raceway surface is formed, and a second attachment on which the second raceway surface is formed. The first attachment and the second attachment are formed symmetrically with each other across the rib, and the first attachment and the second attachment are attached to each surface of the inertia body across the rib while being positioned to align the first raceway surface and the second raceway surface with a predetermined common profile in the axial direction.

In a non-limiting embodiment, a surface hardness of the raceway surface may be harder than a surface hardness of the inertia body.

In a non-limiting embodiment, the pendulum vibration damper may further comprise a positioning member that fixes positions of the first attachment and the second attachment with respect to the inertia body.

In a non-limiting embodiment, the positioning member may include: a dowel hole formed on each of the inertia body, the first attachment, and the second attachment; and a dowel pin inserted into the dowel holes aligned in the axial direction.

In a non-limiting embodiment, attachment positions of the first attachment and the second attachment to the inertia body may be determined with reference to a reference position. In addition, dimension errors of the first attachment and the second attachment from the attachment positions determined with reference to the reference position may be reduced 100 μm or smaller.

According to another aspect of the present disclosure, there is provided a manufacturing method of the pendulum vibration damper, comprising: forming the first raceway surface and the second raceway surface simultaneously on a raw material by a predetermined tool; forming a positioning member on the raw material by another tool; splitting the raw material into a first attachment and a second attachment in a symmetrical manner; and thereafter attaching the first attachment and the second attachment to each surface of the inertia body across the rib, while positioning the first attachment and the second attachment with respect to the inertia body by using the positioning member so as to align the first raceway surface and the second raceway surface with a predetermined common profile in the axial direction across the rib.

In a non-limiting embodiment, the manufacturing method may further comprise applying a hardening treatment to the raceway surface thereby increasing a surface hardness of the raceway surface harder than a surface harness of the inertia body.

In a non-limiting embodiment, the attachments may be made of material harder than material of the inertia body.

In a non-limiting embodiment, the positioning member may include a dowel hole formed on the raw material by the another tool, and a dowel pin, and the first attachment and the second attachment may be positioned with respect to the inertia body by inserting the dowel pin into the dowel holes of the first attachment and the second attachment through the inertia body.

Thus, according to the exemplary embodiment of the present disclosure, the first raceway surface is formed on the first attachment and the second raceway surface is formed on the second attachment, and the first attachment and the second attachment are formed symmetrically with each other. The first attachment and the second attachment are attached to each surface of the inertia body while being positioned to be aligned with the predetermined common profile in the axial direction. That is, profiles of the first raceway surface and the second raceway surface are substantially identical to each other. According to the exemplary embodiment of the present disclosure, therefore, a rotational center axis of the rolling mass oscillated on the raceway surface by the pulsation of the torque rotating the rotary member 2 may be parallel to the rotational center axis of the rotary member. In other words, the rolling mass is allowed to roll on the raceway surface smoothly without being tilted with respect to the rotational center axis. For this reason, a desired vibration damping performance of the pendulum vibration damper may be achieved.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Figure 1:
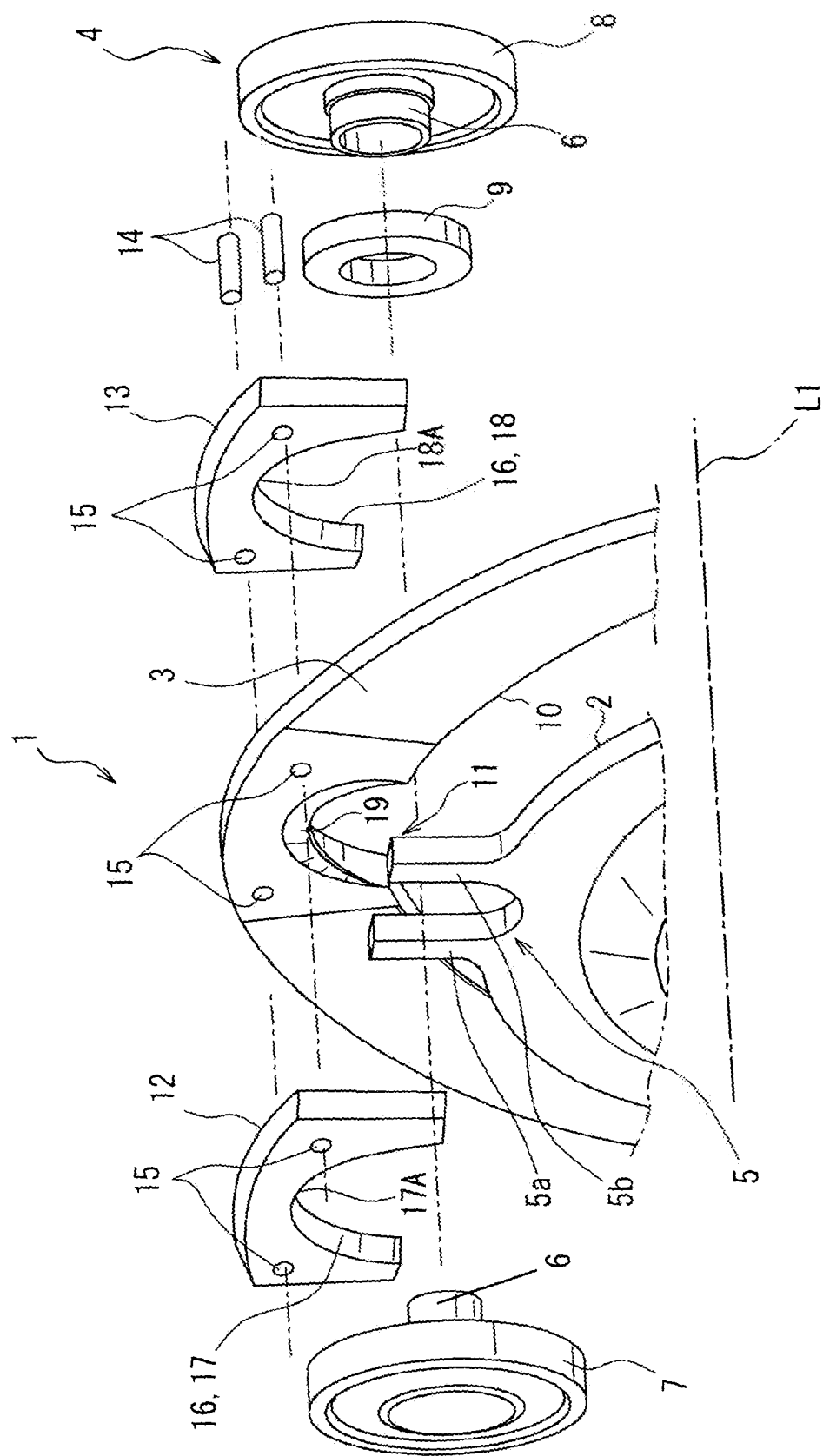
FIG. 1 is an exploded view showing constructional elements of the pendulum vibration damper according to a first example of the present disclosure.

Examples of the present disclosure will now be explained with reference to the accompanying drawings. Referring now to FIG. 1, there is shown a pendulum vibration damper 1 according to the first example of the present disclosure. As illustrated in FIG. 1, the pendulum vibration damper 1 comprises: a rotary member 2 that is rotated by a torque applied thereto; an inertia body 3 arranged concentrically with the rotary member 2; and a plurality of rolling mass 4 connecting the rotary member 2 to the inertia body 3 to transmit the torque applied to the rotary member 2 to the inertia body 3. The inertia body 3 is rotated relatively to the rotary member 2 by a pulsation of the torque transmitted thereto. The rotary member 2 is connected to a prime mover of a vehicle (neither of which are shown) such as a gasoline engine and a diesel engine, and rotated around a rotational center axis L1 by a torque delivered from the prime mover. For example, the rotary member 2 may be mounted on a crankshaft of the engine, a propeller shaft that transmits the torque to a wheel, or an axle shaft of the vehicle (neither of which are shown). The torque of the prime mover is inevitably pulsated, therefore, the rotary member 2 is oscillated in a rotational direction by the pulsation of the torque applied thereto. Consequently, torsional vibrations are generated on the shaft on which the rotary member 2 is mounted.

Figure 2:
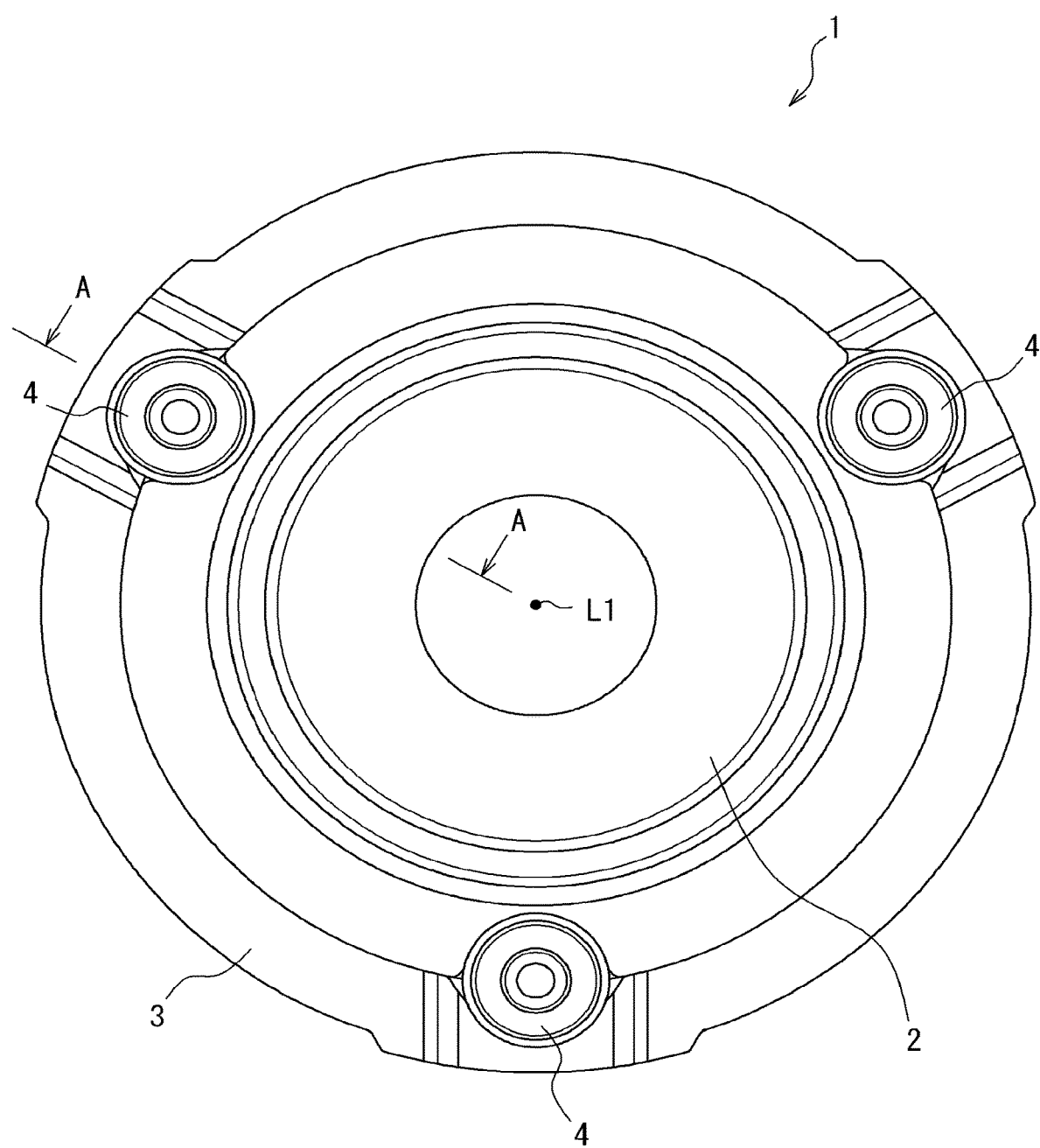
FIG. 2 is a front view showing the pendulum damper according to the present disclosure.

FIG. 2 is a front view of the pendulum vibration damper 1 according to the present disclosure. As illustrated in FIG. 2, the rotary member 2 comprises an annular plate as a main body, and one of the aforementioned shafts is inserted into a center hole of the rotary member 2. Turning back to FIG. 1, a plurality of guide sections 5 as a guide groove are formed on an outer circumference of the rotary member 2 at regular intervals. Optionally, in order to reduce a weight of the rotary member 2, one or more holes may be formed on the rotary member as long as the required strength is maintained.

According to the first example, specifically, three guide sections 5 are formed on the outer circumference of the rotary member 2 at regular intervals. The rolling mass 4 is held in each of the guide sections 5 while being allowed to move in the radial direction but restricted to oscillate in the circumferential direction. Specifically, the guide section 5 comprises a pair of guide pins 5a and 5b individually protruding radially outwardly from the outer circumference of the rotary member 2. A clearance between the guide pins 5a and 5b is slightly wider than a bearing 9 of the rolling mass 4 so that the bearing 9 of the rolling mass 4 is held between the guide pins 5a and 5b. In the guide section 5, the rolling mass 4 is allowed to move in the radial direction between a bottom surface of the guide section 5 and an after-mentioned raceway surface 16 of the inertia body 3.

Figure 3:
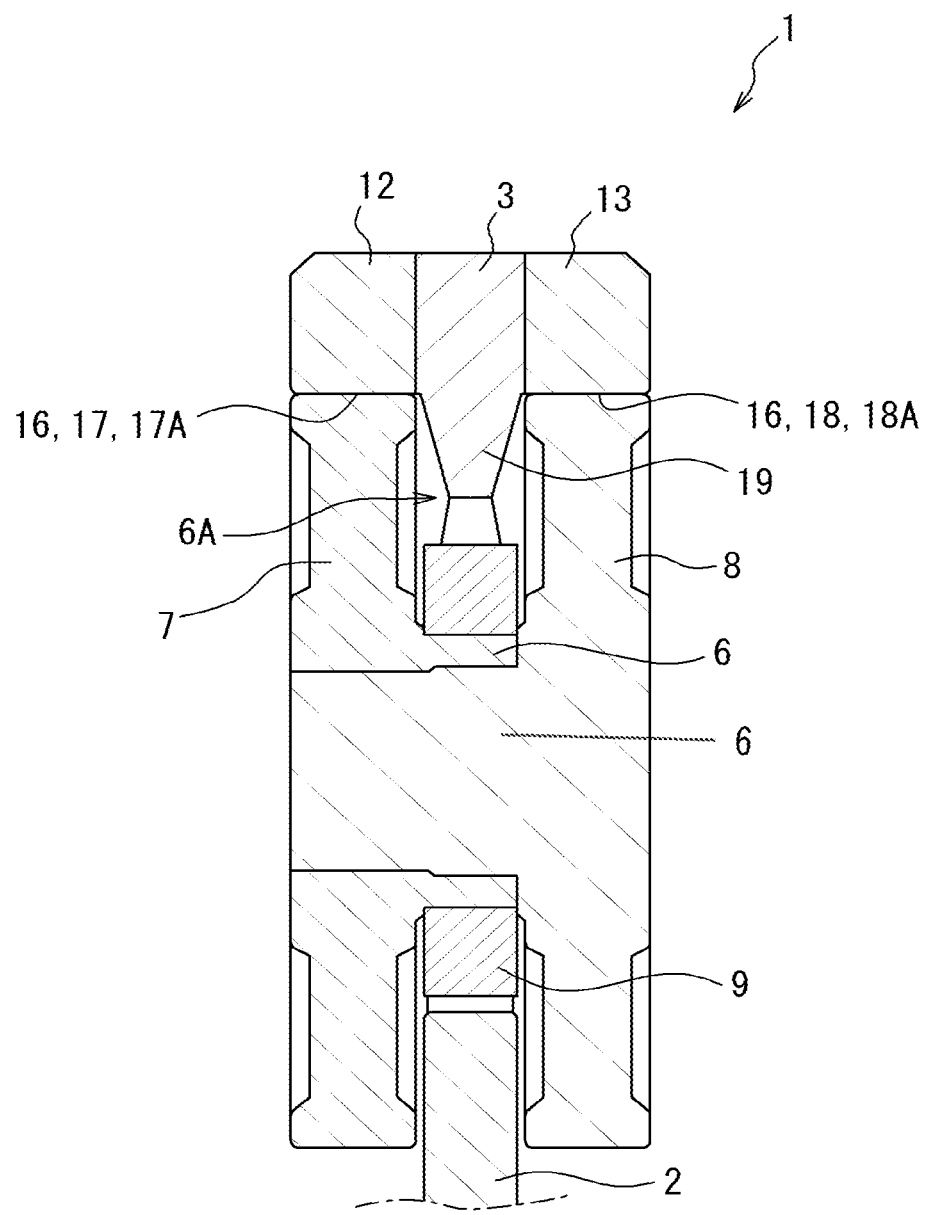
FIG. 3 is a cross-sectional view showing a cross-section of the pendulum vibration damper along A-A line shown in FIG. 2.

When the rotary member 2 is rotated, the rolling masses 4 held in the guide sections 5 of the rotary member 2 revolve around the rotational center axis L1. Consequently, each of the rolling masses 4 is displaced radially outwardly by a centrifugal force, and individually brought into contact to the raceway surface 16 of the inertia body 3. In this situation, the rolling masses 4 are oscillated along the raceway surfaces 16 by the pulsation of the torque rotating the rotary member 2. Turning to FIG. 3, there is shown a cross-section of the rolling mass 4 along A-A line in FIG. 2. As shown in FIG. 3, the rolling mass 4 comprises a shaft portion 6, a first mass 7 formed around one of axial ends of the shaft portion 6; and a second mass 8 formed around the other one of axial ends of the shaft portion 6. Specifically, each of the first mass 7 and the second mass 8 is diametrically larger than the shaft portion 6 so that a groove 6A is created between the first mass 7 and the second mass 8 around the shaft portion 6. That is, each of the first mass 7 and the second mass 8 individually serves as a weight. Here it is to be noted that a shape of the rolling mass 4 should not be limited to a circular shape as long as the rolling mass 4 is allowed to move in the radial direction and oscillate along the raceway surface 16.

An outer diameter of the shaft portion 6 is smaller than a groove width between the guide pins 5a and 5b of the guide section 5, and a length of the shaft portion 6 is longer than a thickness of the rotary member 2. Therefore, the rolling mass 4 is allowed to move smoothly in the radial direction between the guide pins 5a and 5b of the guide section 5 without bringing inner surfaces of the first mass 7 and the second mass 8 into contact to the rotary member 2.

The first mass 7 and the second mass 8 are joined to each other through the shaft portion 6, and as illustrated in FIG. 3, the rolling mass 4 has an H-shaped cross-section. When the first mass 7 and the second mass 8 of rolling mass 4 roll on the raceway surface 16, the shaft portion 6 is rotated between the guide pins 5a and 5b of the guide section 5. In order to allow the rolling mass 4 to move and rotate smoothly in the guide section 5, it is preferable to reduce frictional resistance between the shaft portion 6 and the guide pins 5a and 5b. For this purpose, according to the present disclosure, a bearing 9 is fitted onto the shaft portion 6 of the rolling mass 4.

The inertia body 3 serves as a damper mass that suppresses vibrations of the rotary member 2 resulting from torque pulse by an inertial force as a product of a mass and an acceleration of the inertia body 3. As illustrated in FIGS. 1 and 2, the inertia body 3 is shaped into a ring member, and arranged concentrically with the rotary member 2. The inertia body 3 has a center hole 10 formed around the rotational center axis L1. A diameter of the center hole 10 is larger than an outer diameter of the annular plate section of the rotary member 2 so that the rotary member 2 and the inertia body 3 are allowed to rotate relative to each other without interference. A plurality of cutouts 11 are formed in a radially inner portion of the inertia body 3 such that an inner circumference of the inertia body 3 is depressed radially outwardly at regular intervals in the circumferential direction. As described, the inertia body 3 is situated around the rotary member 2 so that each of the guide sections 5 holding the rolling mass 4 therein is individually situated within the cutout 11. Specifically, an opening width of each of the cutouts 11 is wider than a design value of an oscillation range of the rolling mass 4 in the circumferential direction.

A first attachment 12 and a second attachment 13 are attached to both surfaces of the inertia body 3 in the axial direction while being aligned with the cutout 11. To this end, according to the present disclosure, a pair of dowel holes 15 is formed on the inertia body 3 across the cutout 11 in the circumferential direction, and the pair of dowel holes 15 is also formed on each of the first attachment 12 and the second attachment 13 across the raceway surface 16 in the circumferential direction. The dowel holes 15 of the first attachment 12, the inertia body 3, and the second attachment 13 are aligned to one another in the axial direction, and a pair of dowel pins 14 is inserted into the dowel holes 15 thus aligned on both sides of the cutout 11. Consequently, positions of the first attachment 12, the inertia body 3, and the second attachment 13 are fixed with respect to one another in the axial direction. Accordingly, the dowel pin 14 and dowel hole 15 serve as a positioning member of the exemplary embodiment of the present disclosure. Here, it is to be noted that the first attachment 12 and the second attachment 13 are attached to each site of the inertia body 3 at which the cutout 11 is formed. In addition, the positioning member may be modified according to need. For example, a rivet and a bolt may be employed as the positioning member instead of the dowel pin 14, and the number of dowel holes 15 may be altered according to need.

The raceway surface 16 is formed individually on an inner circumferential portion of each of the first attachment 12 and the second attachment 13. That is, the raceway surface 16 includes a first raceway surface 17 formed on the first attachment 12, and a second raceway surface 18 formed on the second attachment 13. Accordingly, an outer circumference of the first mass 7 is centrifugally pushed onto the first raceway surface 17 of the first attachment 12, and an outer circumference of the second mass 8 is centrifugally pushed onto the second raceway surface 18 of the second attachment 13. Specifically, a width of the first raceway surface 17 of the first attachment 12 in the axial direction is wider than a thickness of the first mass 7 in the axial direction, and a width of the second raceway surface 18 of the second attachment 13 is wider than a thickness of the second mass 8 in the axial direction.

Thus, the first mass 7 is centrifugally pushed onto the first raceway surface 17 of the first attachment 12, and the second mass 8 is centrifugally pushed onto the second raceway surface 18 of the second attachment 13. The first mass 7 and the second mass 8 thus pushed onto the first raceway surface 17 and the second raceway surface 18 are oscillated by the pulsation of the torque applied to the rotary member 2. Therefore, in order to improve wear resistances of the first raceway surface 17 and the second raceway surface 18, it is preferable to form the first attachment 12 and the second attachment 13 using high hardness material. According to the present disclosure, the first attachment 12 and the second attachment 13 are made of alloy tool steel material SKD11 defined by Japanese Industrial Standards (JIS). Whereas, the rolling mass 4 will not be pushed onto the rotary member 2 and the inertia body 3 not so strongly compared to the first raceway surface 17 and the second raceway surface 18. Therefore, the rotary member 2 and the inertia body 3 may be made of relatively low hardness material. According to the present disclosure, the rotary member 2 and the inertia body 3 are formed of carbon steel material S45 defined by JIS. Thus, according to the present disclosure, surface hardness of each of the first raceway surface 17 and the second raceway surface 18 is individually harder than surface harnesses of the rotary member 2 including the guide sections 5, and surface harnesses of the inertia body 3. Since different materials are selected to form the constitutional elements of the pendulum vibration damper 1 according to the required hardness, abrasion of the raceway surface 16 can be prevented, and in addition, a manufacturing cost of the pendulum vibration damper 1 can be reduced.

A curvature radius of the raceway surface 16 is shorter than a radial distance between the raceway surface 16 and the rotational center axis L1. Specifically, the first raceway surface 17 is an arcuate surface in which a central portion 17A in the circumferential direction is depressed radially outwardly, and the second raceway surface 18 is also an arcuate surface in which a central portion 18A in the circumferential direction is depressed radially outwardly. When the rotary member 2 is rotated at a speed higher than a certain level, the rolling masses 4 held in the guide sections 5 of the rotary member 2 are centrifugally displaced toward radially outer side. Consequently, the first mass 7 of the rolling mass 4 is brought into contact to the first raceway surface 17 of the first attachment 12, and the second mass 8 of the rolling mass 4 is brought into contact to the second raceway surface 18 of the second attachment 13. In this situation, given that a normal line of the rolling mass 4 coincides with a direction of application of the centrifugal force, the rolling mass 4 is stabilized at the central portion 17A, 18A of the raceway surface 16 which is farthest from the rotational center axis L1. When each of the rolling masses 4 is individually stabilized at the central portion 17A, 18A of each of the raceway surfaces 16, the rotary member 2 and the inertia body 3 are brought into a neutral state. In this situation, the rolling masses 4 are merely pushed onto the raceway surfaces 16 by the centrifugal force without applying torque to the inertia body 3.

Thus, the rotary member 2 and the inertia body 3 are connected to each other through the rolling masses 4. When the rotary member 2 and the inertia body 3 are rotated relatively to each other by the pulsation of the torque applied to the rotary member 2, the rotary member 2 and the inertia body 3 are brought back into the neutral state where a relative angle or a phase difference between the rotary member 2 and the inertia body 3 is zero, by the oscillating motions of the rolling masses 4.

In order to align a relative position of the rolling mass 4 in the axial direction with respect to the inertia body 3, in the cutout 11, an aligning rib 19 protrudes from an inner circumferential edge of the inertia body 3 radially inwardly between the first raceway surface 17 and the second raceway surface 18. A protruding length of the aligning rib 19 is shorter than a distance between the raceway surface 16 and the bearing 9 of the rolling mass 4 provided that the first mass 7 and the second mass 8 are contacted to the first raceway surface 17 and the second raceway surface 18. That is, the aligning rib 19 is situated within the groove 6A between the first mass 7 and the second mass 8, without contacting to the shaft portion 6 and the bearing 9. A thickness of the aligning rib 19 in the axial direction is reduced gradually from a radially outermost portion toward the rotational center axis L1 of the inertia body 3. Specifically, the aligning rib 19 comprises an inclined surface opposed to the first mass 7 and an inclined surface opposed to the second mass 8, and those inclined surfaces get closer to each other toward an inner edge of the aligning rib 19. Therefore, when the first mass 7 or the second mass 8 being displaced in the axial direction comes into contact to the inclined surface of the aligning rib 19, a component of force is established at a contact site between the first mass 7 or the second mass 8 and the inclined surface of the aligning rib 19. Consequently, the rolling mass 4 is returned to an appropriate position in the axial direction by the component of force. That is, a displacement of the rolling mass 4 in the axial direction is corrected by the component of force established by the aligning rib 19. Specifically, the thickness of the aligning rib 19 between the inclined surfaces is thickest at the radially outermost portion, and the thickness of the aligning rib 19 at the radially outermost portion is substantially identical to a clearance between the first mass 7 and the second mass 8 in the axial direction.

Figure 4A:
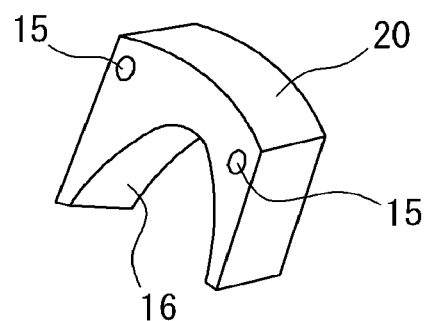
FIGS. 4A and 4B are illustrative drawings showing procedures to manufacturing the first attachment and the second attachment.
Figure 4B:
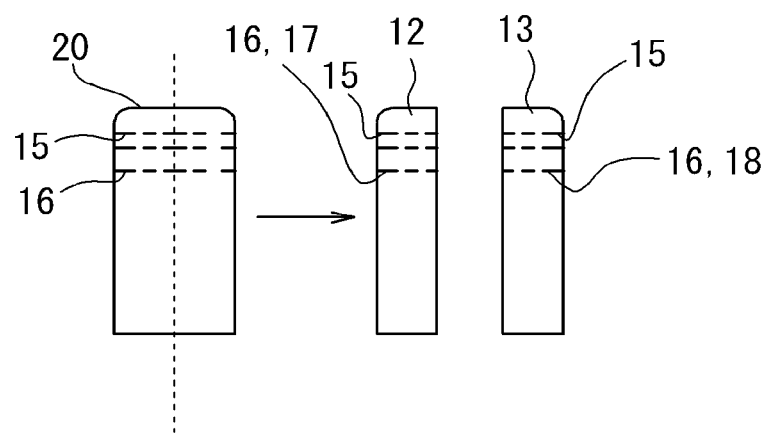

Here will be explained the procedures for manufacturing the first attachment 12 and the second attachment 13 with reference to FIGS. 4A and 4B. According to the first example, first of all, a raw material 20 that is substantially twice as thick as the raceway surface 16 in the axial direction is prepared. According to the present disclosure, the raw material 20 is made of material harder than materials of the rotary member 2 and the inertia body 3. As illustrated in FIG. 4A, the dowel holes 15 are formed in the raw material 20 at the same radial level from the rotational center axis L1 as a reference position, on both sides of a site where the raceway surface 16 is to be formed. To this end, specifically, a pair of pilot holes is drilled on the raw material 20 at the above-explained sites to penetrate through the raw material 20 in the thickness direction. Then, the pilot holes are reamed to form the dowel holes 15. A shape of the raw material 20 viewed in the axial direction is identical to those of the first attachment 12 and the second attachment 13.

Thereafter, the raceway surface 16 is formed on a portion to be radially inner side with respect to the dowel holes 15. For example, the raceway surface 16 may be formed by punching the raw material 20 from one side in the axial direction to form an arcuate surface, and smoothening the arcuate surface by a milling cutter. Instead, the raceway surface 16 may also be formed by a cutting method or a boring method. Thereafter, as illustrated in FIG. 4B, the raw material 20 is split into two halves along a median line in the thickness direction. Consequently, the first attachment 12 and the second attachment 13 are formed symmetrically. In other words, the first attachment 12 and the second attachment 13 thus formed in the same configuration. For example, the raw material 20 may be split into the first attachment 12 and the second attachment 13 by a cutter, a blade, a laser, an injection cutter, or the like.

Figure 5A:
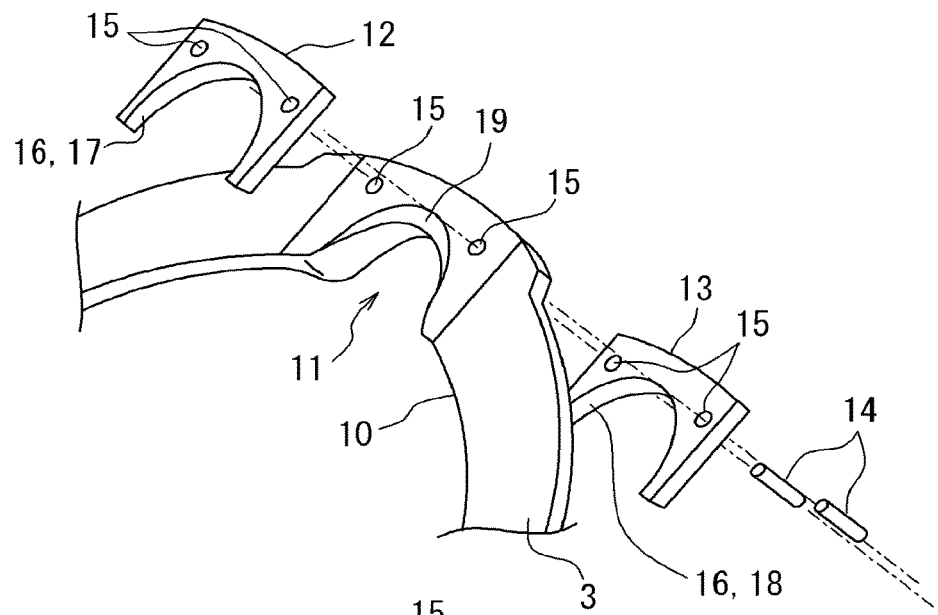
FIGS. 5A, 5B, and 5C are illustrative drawings showing procedures to attach the first attachment and the second attachment to the inertia body.
Figure 5B:
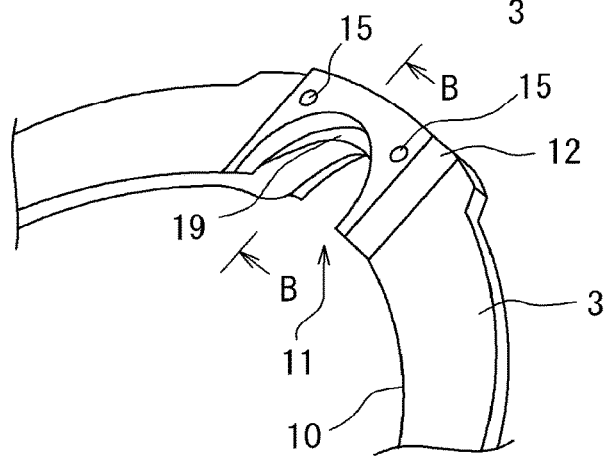
Figure 5C:
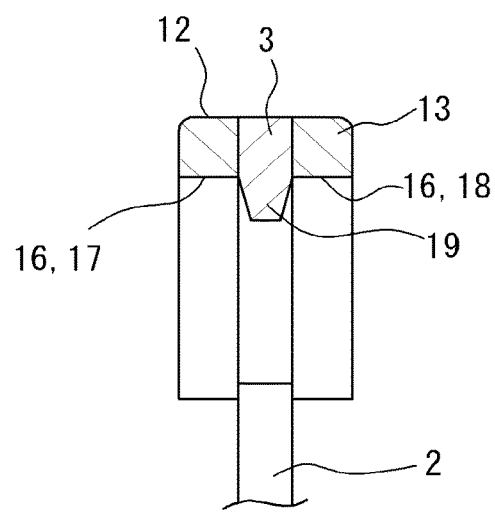

Here will be explained the procedures for attaching the first attachment 12 and the second attachment 13 to the inertia body 3 with reference to FIGS. 5A, 5B, and 5C. As illustrated in FIGS. 5A, 5B, and 5C, a pair of the dowel holes 15 are also formed in the inertia body 3 at sites being congruent with the dowel holes 15 formed on the first attachment 12 and the second attachment 13. First of all, as illustrated in FIG. 5A, the first attachment 12 and the second attachment 13 are placed on both sides of the cutout 11 of the inertia body 3 in the axial direction while aligning the dowel holes 15 of the first attachment 12 and the second attachment 13 with the dowel holes 15 of the inertia body 3. Then, as illustrated in FIG. 5B, the first attachment 12 and the second attachment 13 are fixed temporarily to the inertia body 3 by inserting the dowel pins 14 into the dowel holes 15 aligned on both sides of the cutout 11 from one side in the axial direction. As described, since the first attachment 12 and the second attachment 13 are formed by splitting the raw material 20, profiles of the first raceway surface 17 of the first attachment 12 and the second raceway surface 18 of the second attachment 13 are identical to each other, and the dowel holes 15 are formed at the same sites in the first attachment 12 and the second attachment 13. Therefore, the first raceway surface 17 of the first attachment 12 and the second raceway surface 18 of the second attachment 13 are aligned accurately with each other across the inertia body 3 by inserting the dowel pins 14 into the dowel holes 15 aligned on both sides of the cutout 11. FIG. 5C, shows a cross-section of the inertia body 3 to which the first attachment 12 and the second attachment 13 are attached along the B-B line in FIG. 5B. As shown in FIG. 5C, radial levels the first raceway surface 17 of the first attachment 12 and the second raceway surface 18 of the second attachment 13 are aligned accurately with each other in the axial direction at the same radial level. Thereafter, the first attachment 12 and the second attachment 13 are fixed to the inertia body 3 by a bolt or a rivet (neither of which are shown).

Thus, according to the first example, the raceway surface and the dowel hole(s) 15 are formed on the raw material 20, and then, the raw material 20 is split into the first attachment 12 and the second attachment 13. According to the first example, therefore, the profiles of the first raceway surface 17 of the first attachment 12 and the second raceway surface 18 of the second attachment 13 may be identical to each other, and the dowel holes 15 may be formed at the same sites in the first attachment 12 and the second attachment 13. For this reason, after attaching to the first attachment 12 and the second attachment 13 by inserting the dowel pins 14 into the dowel holes 15 aligned on both sides of the cutout 11 of the inertia body 3, the profiles of the first raceway surface 17 of the first attachment 12 and the second raceway surface 18 of the second attachment 13 will be aligned accurately with each other across the inertia body 3 at designed sites within a common zone. In order to allow the first mass 7 and the second mass 8 of the rolling mass 4 smoothly on the first raceway surface 17 of the first attachment 12 and the second raceway surface 18 of the second attachment 13, according to the first example, the common zone of the first raceway surface 17 and the second raceway surface 18 is set to 0.1 mm or smaller. In other words, dimension errors of the actual profiles of the first raceway surface 17 and the second raceway surface 18 from a designed profile may be reduced within 0.1 mm. Accordingly, a designed profile of each of the first raceway surface 17 and the second raceway surface 18 corresponds to a "predetermined common profile" of the present disclosure.

Here will be explained an action of the pendulum vibration damper 1. The rotary member 2 is rotated by a torque applied thereto, and the rolling masses 4 held in the guide sections 5 revolve around the rotational center axis L1. In this situation, each of the rolling masses 4 is subjected to centrifugal force depending on a distance from the rotational center axis L1. When the centrifugal force overcomes gravitational force, the rolling masses 4 are displaced radially outwardly in the guide sections 5. In this situation, specifically, an outer race of the bearing 9 of each of the rolling masses 4 being displaced radially outwardly rolls on the guide pins 5a and 5b of the guide sections 5. Eventually, the first mass 7 is pushed onto the first raceway surface 17 of the first attachment 12, and the second mass 8 is pushed onto the second raceway surface 18 of the second attachment 13. In this situation, given that the torque rotating the rotary member 2 is not subjected to pulsation, each of the rolling masses 4 is stabilized at the central portion 17A, 18A as the radially outermost portion of the raceway surface 16.

When the torque rotating the rotary member 2 is subjected to pulsation, the rotary member 2 is subjected to an angular acceleration. In this situation, the inertia body 3 is inertially maintained at an initial relative position with respect to the rotary member 2, and hence the rotary member 2 is rotated relatively to the inertia body 3. Consequently, each of the rolling masses 4 is moved by the rotary member 2 from the central portion 17A, 18A to an end portion of the raceway surface 16. That is, a contact portion between the rolling mass 4 and the raceway surface 16 is displaced in the circumferential direction. In this situation, since the curvature radius of the raceway surface 16 is shorter than a curvature radius of an outer circumference of the rotary member 2, each of the rolling mass 4 is also displaced radially inwardly toward the rotational center axis L1.

Each of the rolling masses 4 thus moved to the end portions of the raceway surface 16 is individually pushed back toward the central portion 17A, 18A of the raceway surface 16 by a component of the centrifugal force established at the contact portion between the rolling mass 4 and the raceway surface 16. As a result, a torque to return the inertia body 3 to the initial relative position with respect to the rotary member 2 is established. The torque thus established serves as a vibration damping torque to damp the vibrations derived from the pulsation of the torque rotating the rotary member 2. That is, the inertia body 3 is oscillated in opposite phase to vibrations of the rotary member 2 so that the vibrations of the rotary member 2 is damped by an inertia moment of the inertia body 3.

Figure 6:
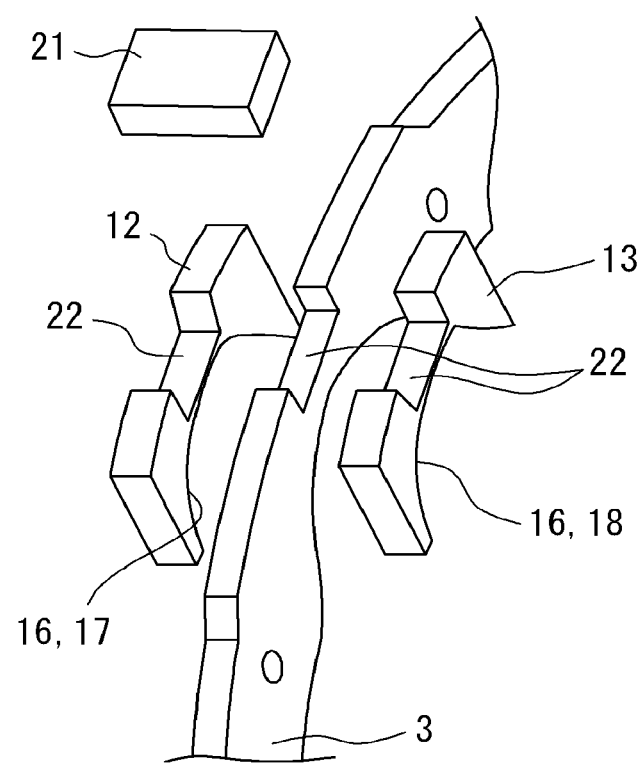
FIG. 6 is a perspective view showing a structure of the attachment according to a second example of the present disclosure.

Turning to FIG. 6, there is shown the second example of the present disclosure. According to the second example, the first attachment 12 and the second attachment 13 are positioned with respect to the inertia body 3 by a key 21 and a keyseat 22, instead of the dowel pin 14 and the dowel hole 15. Specifically, as illustrated in FIG. 6, the keyseat 22 as a depression is formed on the outer circumference of the inertia body 3 at radially outer side of the cutout 11. The keyseat 22 is also formed on the outer circumference of the first attachment 12 at radially outer side of central portion 17A, and on the outer circumference of the second attachment 13 at radially outer side of central portion 18A.

According to the second example, although not especially shown, the first attachment 12 and the second attachment 13 are manufactured by the similar procedure as the first example. Specifically, the keyseat 22 and the raceway surface 16 are formed on the raw material 20 by a pressing method, a cutting method or the like, and then the raw material 20 is split into the first attachment 12 and the second attachment 13 by a cutter, a blade, a laser, an injection cutter, or the like. According to the second example, specifically, the keyseat 22 is formed on the outer circumference of the raw material 20 over the entire length in the thickness direction. The first attachment 12 and the second attachment 13 thus prepared are placed on both sides of the cutout 11 of the inertia body 3 in the axial direction while aligning the keyseats 22 of the first attachment 12 and the second attachment 13 with the keyseat 22 of the inertia body 3. Then, the first attachment 12 and the second attachment 13 are fixed temporarily to the inertia body 3 by fitting the key 21 into the keyseats 22 aligned in the axial direction. Thereafter, the first attachment 12 and the second attachment 13 are fixed to the inertia body 3 by a bolt or a rivet (neither of which are shown). The remaining elements of the pendulum vibration damper 1 according to the second example are similar to those of the pendulum vibration damper 1 according to the first example. Therefore, detailed explanations for the elements in common with those of the pendulum vibration damper 1 according to the first example will be omitted by assigning common reference numerals to the common elements.

Figure 7:
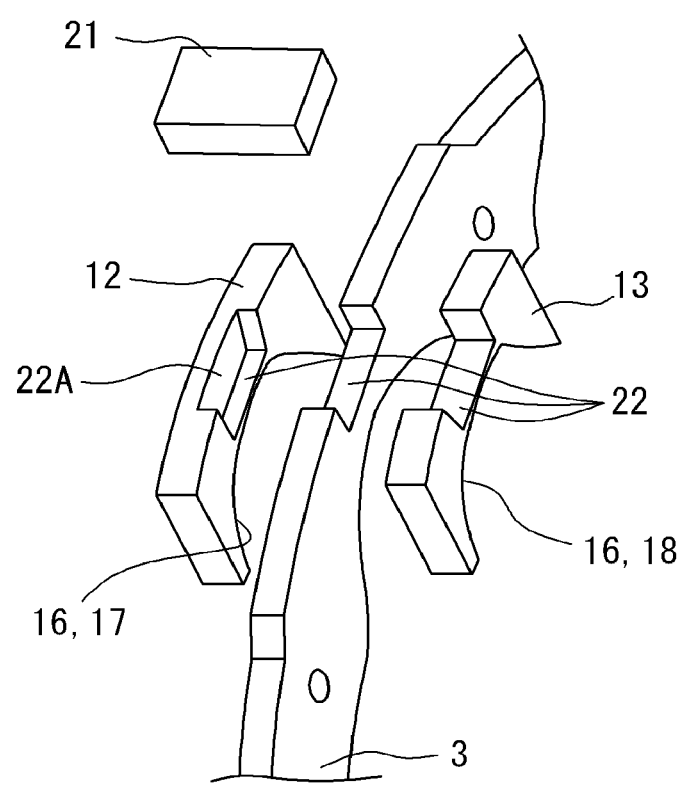
FIG. 7 is a perspective view showing a structure of the attachment according to a third example of the present disclosure.

Turning to FIG. 7, there is shown the third example of the present disclosure. According to the third example, disengagement of the key 21 from the keyseat 22 in one of axial directions is prevented. To this end, the keyseat 22 is formed on the outer circumference of the raw material 20 not entirely in the thickness direction. Therefore, after splitting the raw material 20 into the first attachment 12 and the second attachment 13, one of outer surfaces of the raw material 20 in the axial direction of the pendulum vibration damper 1 remains in e.g., the first attachment 12 to serve as a retaining wall 22A. That is, as illustrated in FIG. 7, a length of the keyseat 22 of the first attachment 12 in the axial direction is shorter than a length of the first attachment 12 in the axial direction. According to the third example, therefore, disengagement of the key 21 from the keyseat 22 in the direction toward the first attachment 12 is prevented by the retaining wall 22A of the first attachment 12. On the other hand, in the second attachment 13, the keyseat 22 is formed entirely in the thickness direction. The first attachment 12 and the second attachment 13 thus prepared are placed on both sides of the cutout 11 of the inertia body 3 in the axial direction while aligning the keyseats 22 of the first attachment 12 and the second attachment 13 with the keyseat 22 of the inertia body 3. Then, the first attachment 12 and the second attachment 13 are fixed temporarily to the inertia body 3 by fitting the key 21 into the keyseats 22 aligned in the axial direction. Thereafter, the first attachment 12 and the second attachment 13 are fixed to the inertia body 3 by a bolt or a rivet (neither of which are shown). The remaining elements of the pendulum vibration damper 1 according to the third example are similar to those of the foregoing examples. Therefore, detailed explanations for the elements in common with those of the foregoing examples will be omitted by assigning common reference numerals to the common elements.

Thus, according to the second and third examples, the first attachment 12 and the second attachment 13 are formed by splitting the raw material 20 on which the raceway surface 16 and the keyseat 22 are formed. Therefore, the first raceway surface 17 of the first attachment 12 and the second raceway surface 18 of the second attachment 13 are aligned accurately with each other across the inertia body 3 by fitting the key 21 into the keyseat 22 aligned in the axial direction. In other words, errors of the actual profiles of the first raceway surface 17 and the second raceway surface 18 from the designed profile may also be reduced within the common zone. In addition, according to the third example, disengagement of the key 21 from the keyseat 22 in the direction toward the first attachment 12 may be prevented to maintain a relative position among the first attachment 12, the inertia body 3, and the second attachment 13.

Figure 8:
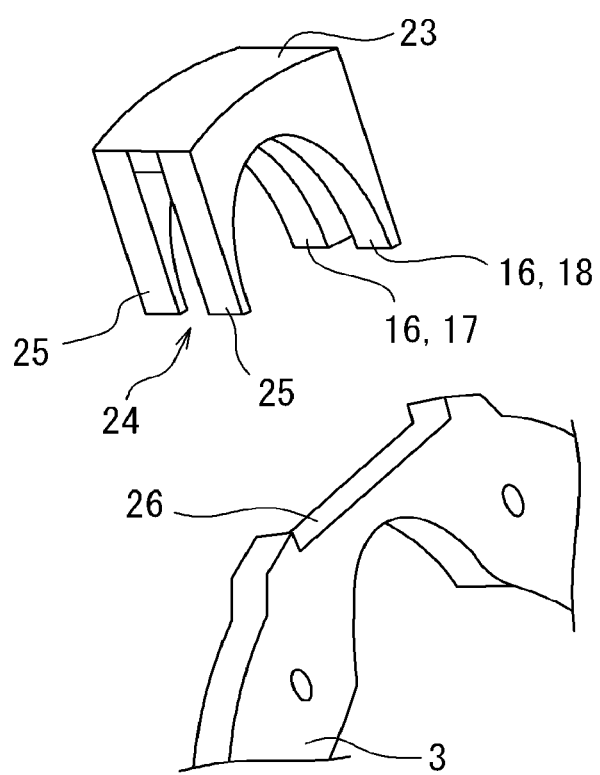
FIG. 8 is a perspective view showing a structure of the attachment according to a fourth example of the present disclosure.

Turning to FIG. 8, there is shown the fourth example of the present disclosure. According to the fourth example, the first attachment 12 and the second attachment 13 are formed integrally as an attachment 23, and the attachment 23 is engaged with the inertia body 3. That is, a thickness of the attachment 23 is identical to a total thickness of the first raceway surface 17, the inertia body 3, and the second raceway surface 18. Specifically, the attachment 23 comprises: a pair of engagement pieces 25 joined to each other at radially outermost portion of the attachment 23; and an engagement groove 24 formed between the engagement pieces 25. A width of the engagement groove 24 in the thickness direction is substantially identical to the thickness of the inertia body 3 so that the inertia body 3 is inserted into the engagement groove 24. As the foregoing examples, after fitting the attachment 23 onto the portion of the inertia body 3 at which the cutout 11 is formed, the first raceway surface 17 and the second raceway surface 18 are accurately aligned to each other across the inertia body 3 in the axial direction.

According to the fourth example, the dowel holes 15 are also formed on the raw material 20 at the same radial level from the rotational center axis L1, and the raceway surface 16 is formed radially inner side of the dowel holes 15. Thereafter, the engagement groove 24 is formed by cutting an intermediate portion of the raw material 20 in the thickness direction from a radially inner portion toward a radially outer portion. Consequently, the engagement pieces 25 are formed on both sides of the engagement groove 24 in the thickness direction. The raceway surface 16 formed on one of the engagement pieces 25 serves as the first raceway surface 17, and the raceway surface 16 formed on the other one of the engagement pieces 25 serves as the second raceway surface 18.

According to the fourth example, a depression 26 is formed on the outer circumference of the inertia body 3 at radially outer side of the cutout 11. Both ends of the depression 26 in the circumferential direction individually protrude radially outwardly so that the attachment 23 fitted into the depression 26 is positioned by those protrusions. That is, the attachment 23 is fitted onto the inertia body 3 in such a manner that a bottom of the engagement groove 24 is brought into contact to a bottom of the depression 26. The remaining elements of the pendulum vibration damper 1 according to the fourth example are similar to those of the foregoing examples. Therefore, detailed explanations for the elements in common with those of the foregoing examples will be omitted by assigning common reference numerals to the common elements.

Figure 9:
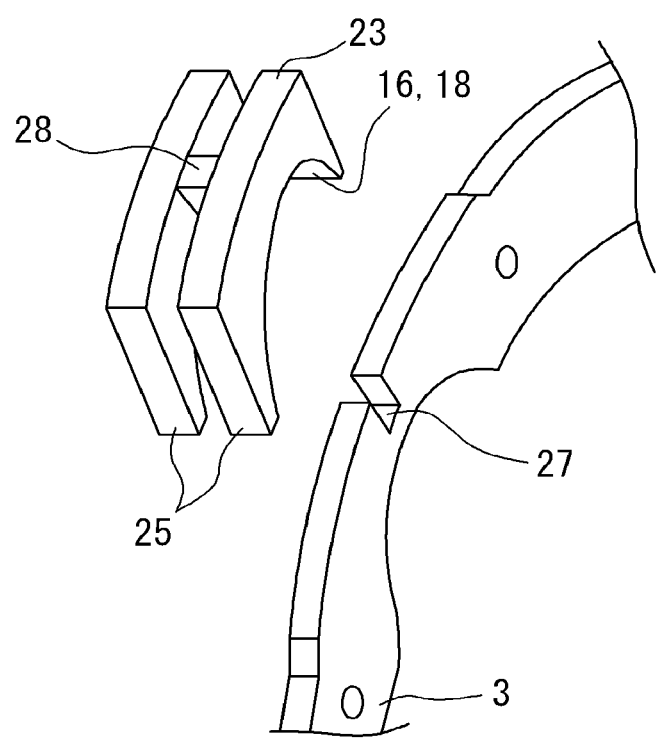
FIG. 9 is a perspective view showing a structure of the attachment according to a fifth example of the present disclosure.

Turning to FIG. 9, there is shown the fifth example of the present disclosure as a modification of the fourth example. According to the fifth example, a groove 27 that is narrower than the depression 26 shown in FIG. 8 in the circumferential direction is formed on the outer circumference of the inertia body 3 at radially outer side of the cutout 11, and a projection 28 is formed on the intermediate portion of the attachment 23 between the engagement pieces 25. That is, the attachment 23 is fitted onto the inertia body 3 in such a manner that the projection 28 of the attachment 23 is fitted into the groove 27 of the inertia body 3. The remaining elements of the pendulum vibration damper 1 according to the fifth example are similar to those of the foregoing examples. Therefore, detailed explanations for the elements in common with those of the foregoing examples will be omitted by assigning common reference numerals to the common elements.

Thus, according to the fourth and fifth examples, the engagement pieces 25 are formed integrally as the attachment 23 by processing the raw material 20. Therefore, the first raceway surface 17 and the second raceway surface 18 may also be aligned accurately with each other across the inertia body 3 by fitting the attachment 23 onto the inertia body 3. In other words, errors of the actual profiles of the first raceway surface 17 and the second raceway surface 18 from the designed profile may also be reduced within the common zone. In addition, according to the fourth and fifth examples, the number of parts of the pendulum vibration damper 1 may be reduced, and hence required man-hour for manufacturing the pendulum vibration damper 1 may be reduced.

Although the above examples of the present disclosure have been described, it will be understood by those skilled in the art that the present disclosure should not be limited to the described examples, and various changes and modifications can be made within the scope of the present disclosure. For example, the first attachment 12 and the second attachment 13 may also be made of chrome molybdenum steel SCM20 defined by JIS, and the rotary member 2 and the inertia body 3 may also be made of carbon steel S15 defined by JIS. Instead, the first attachment 12 and the second attachment 13 may also be made of carbon steel S45 defined by JIS. In this case, surface hardness of the first raceway surface 17 and the second raceway surface 18 may be increased by a hardening treatment such as high-frequency quenching. For example, the pendulum vibration damper 1 according to the present disclosure may be applied to a hybrid vehicle in which a prime mover includes an engine and a motor, and a vehicle in which an engine torque is delivered to a transmission without passing through a torque converter.

What is claimed is:

1. A pendulum vibration damper, comprising:
   a rotary member that is rotated around a predetermined rotational center axis by a torque applied thereto;
   an inertia body that is arranged coaxially with the rotary member while being allowed to rotate relatively to the rotary member;
   a raceway surface that is arranged on a radially outer side of the rotational center axis of the inertia body; and
   a rolling mass that is held by the rotary member to revolve around the rotational center axis with a rotation of the rotary member while being allowed to move in a radial direction,
   wherein the rolling mass is brought into contact to the raceway surface by a centrifugal force derived from the rotation of the rotary member, and oscillated on the raceway surface by a pulsation of the torque applied to the rotary member,
   the rolling mass comprises: a first mass having a circular shape; a second mass having a circular shape being opposed to the first mass in an axial direction; and a groove created between the first mass and the second mass,
   the raceway surface includes a first raceway surface to which the first mass is contacted by the centrifugal force, and a second raceway surface to which the second mass is contacted by the centrifugal force,
   the first raceway surface and the second raceway surface are arcuate surfaces that are depressed radially outwardly,
   a curvature radius of the first raceway surface is shorter than a radial distance between the first raceway surface and the rotational center axis, and a curvature radius of the second raceway surface is shorter than a radial distance between the second raceway surface and the rotational center axis,
   the inertia body is situated between the first raceway surface and the second raceway surface in the axial direction,
   the inertia body comprises a rib that protrudes radially inwardly from the first raceway surface and the second raceway surface to be situated within the groove of the rolling mass at least partially so as to restrict an axial movement of the rolling mass,
   the rolling mass oscillated toward one end of the raceway surface by the pulsation of the torque applied to the rotary member is returned to a radially outermost portion of the raceway surface by a torque established by a displacement of the rolling mass from the radially outermost portion to said one end of the raceway surface,
   the torque established by the displacement of the rolling mass from the radially outermost portion to said one end of the raceway surface acts as a vibration damping torque to damp vibrations derived from the pulsation of the torque applied to the rotary member,
   the pendulum vibration damper further comprises a first attachment on which the first raceway surface is formed, and a second attachment on which the second raceway surface is formed,
   the first attachment and the second attachment are formed symmetrically with each other across the rib,
   the first attachment and the second attachment are attached to each surface of the inertia body across the rib while being positioned to align the first raceway surface and the second raceway surface with a predetermined common profile in the axial direction, and
   the pendulum vibration damper further comprises a positioning member that fixes positions of the first attachment and the second attachment with respect to the inertia body.

2. The pendulum vibration damper as claimed in claim 1, wherein a surface hardness of the raceway surface is harder than a surface hardness of the inertia body.

3. The pendulum vibration damper as claimed in claim 1, wherein the positioning member includes:
   a dowel hole formed on each of the inertia body, the first attachment, and the second attachment, and
   a dowel pin inserted into the dowel holes aligned in the axial direction.

4. The pendulum vibration damper as claimed in claim 1, wherein attachment positions of the first attachment and the second attachment to the inertia body are determined with reference to a reference position, and dimension errors of the first attachment and the second attachment from the attachment positions determined with reference to the reference position is 100 μm or smaller.

5. A manufacturing method of a pendulum vibration damper comprising:
a rotary member that is rotated around a predetermined rotational center axis by a torque applied thereto;
an inertia body that is arranged coaxially with the rotary member while being allowed to rotate relatively to the rotary member;
a raceway surface that is arranged on a radially outer side of the rotational center axis of the inertia body; and
a rolling mass that is held by the rotary member to revolve around the rotational center axis with a rotation of the rotary member while being allowed to move in a radial direction,
wherein the rolling mass is brought into contact to the raceway surface by a centrifugal force derived from the rotation of the rotary member, and oscillated on the raceway surface by a pulsation of the torque applied to the rotary member,
the rolling mass comprises: a first mass having a circular shape; a second mass having a circular shape being opposed to the first mass in an axial direction; and a groove created between the first mass and the second mass,
the raceway surface includes a first raceway surface to which the first mass is contacted by the centrifugal force, and a second raceway surface to which the second mass is contacted by the centrifugal force,
the first raceway surface and the second raceway surface are arcuate surfaces that are depressed radially outwardly,
a curvature radius of the first raceway surface is shorter than a radial distance between the first raceway surface and the rotational center axis, and a curvature radius of the second raceway surface is shorter than a radial distance between the second raceway surface and the rotational center axis,
the inertia body is situated between the first raceway surface and the second raceway surface in the axial direction,
the inertia body comprises a rib that protrudes radially inwardly from the first raceway surface and the second raceway surface to be situated within the groove of the rolling mass at least partially so as to restrict an axial movement of the rolling mass,
the rolling mass oscillated toward one end of the raceway surface by the pulsation of the torque applied to the rotary member is returned to a radially outermost portion of the raceway surface by a torque established by a displacement of the rolling mass from the radially outermost portion to said one end of the raceway surface,
the torque established by the displacement of the rolling mass from the radially outermost portion to said one end of the raceway surface acts as a vibration damping torque to damp vibrations derived from the pulsation of the torque applied to the rotary member,
the manufacturing method comprising:
forming the first raceway surface and the second raceway surface simultaneously on a raw material by a predetermined tool;
forming a positioning member on the raw material by another tool;
splitting the raw material into a first attachment and a second attachment in a symmetrical manner; and
thereafter attaching the first attachment and the second attachment to each surface of the inertia body across the rib, while positioning the first attachment and the second attachment with respect to the inertia body by using the positioning member so as to align the first raceway surface and the second raceway surface with a predetermined common profile in the axial direction across the rib.

6. The manufacturing method of the pendulum vibration damper as claimed in claim 5, further comprising:
applying a hardening treatment to the raceway surface thereby increasing a surface hardness of the raceway surface harder than a surface harness of the inertia body.

7. The manufacturing method of the pendulum vibration damper as claimed in claim 5, wherein the attachments are made of material harder than material of the inertia body.

8. The manufacturing method of the pendulum vibration damper as claimed in claim 5,
wherein the positioning member includes a dowel hole formed on the raw material by the another tool, and a dowel pin, and
the first attachment and the second attachment are positioned with respect to the inertia body by inserting the dowel pin into the dowel holes of the first attachment and the second attachment through the inertia body.

* * * * *